J. M. ALDEN.
WATER SPRINKLER.
APPLICATION FILED OCT. 15, 1909.
963,199.
Patented July 5, 1910.
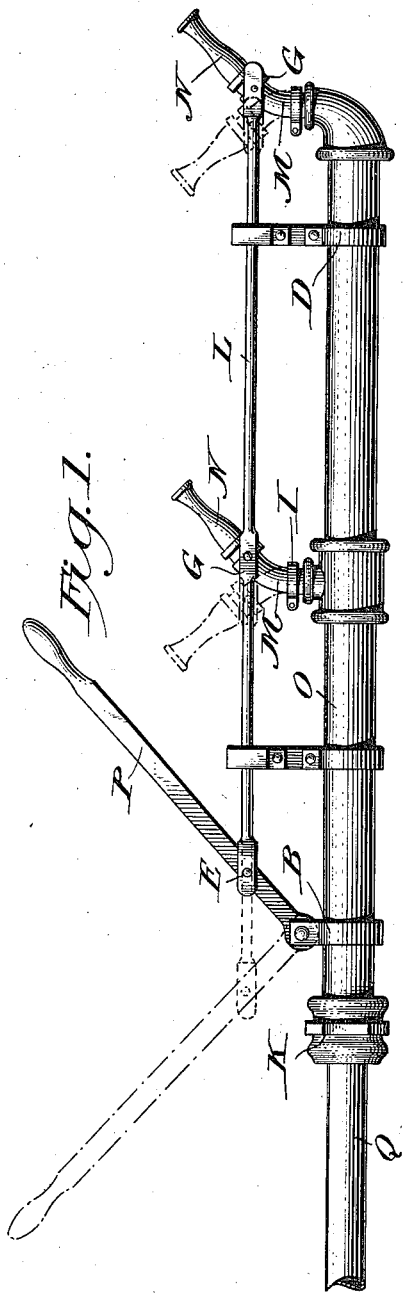
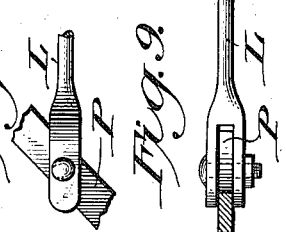
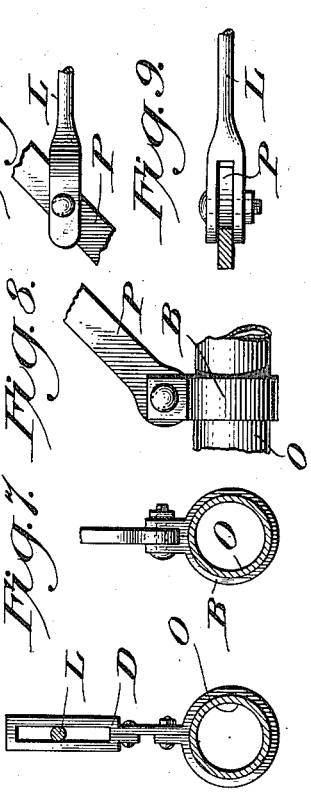
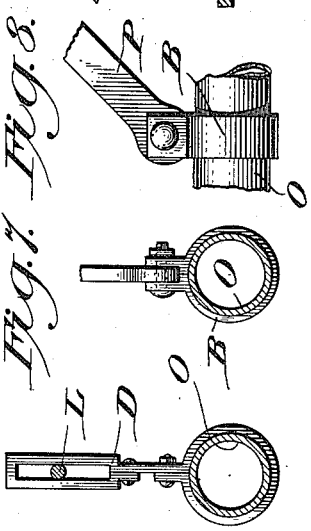
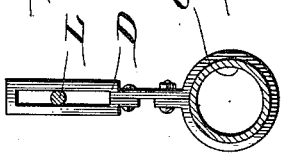
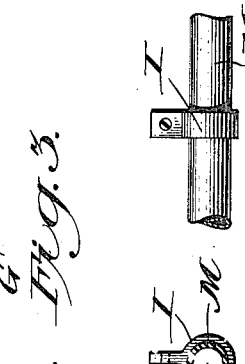
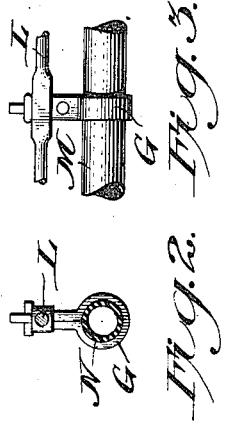

UNITED STATES PATENT OFFICE.

JAMES M. ALDEN, OF AMARILLO, TEXAS, ASSIGNOR OF ONE-THIRD TO DAVID DERDEN AND ONE-THIRD TO DANIEL JACKSON STOBAUGH, BOTH OF AMARILLO, TEXAS.

WATER-SPRINKLER.

963,199.      Specification of Letters Patent.    Patented July 5, 1910.

Application filed October 15, 1909. Serial No. 522,887.

*To all whom it may concern:*

Be it known that I, JAMES M. ALDEN, a citizen of the United States, residing at Amarillo, in the county of Potter and State of Texas, have invented a new and useful Water-Sprinkler, of which the following is a specification.

My invention relates to improvements in water sprinklers, in which a connected series of nozzles are each flexibly connected to a pipe to permit of adjustment, and the objects of my improvements are, first, to provide a longitudinal pipe and a rotative connection of said pipe with the supply pipe and source of water supply; second, to provide a rod connecting said series of nozzles; third, to provide guides for said rod attached at intervals to said pipe; and fourth, to provide a lever attached to longitudinal pipe and to said rod for rotating said pipe. I attain these objects by the mechanism illustrated by the accompanying drawing, in which—

Figure 1 is a perspective view of the complete device. Figs. 2 and 3 are detailed views of the connection between the connecting rod and nozzle. Figs. 4 and 5 show the connection between the hose and nozzle. Fig. 6 shows one of the guides for the connecting rods. Figs. 7 and 8 are details showing the clamp connecting the operating lever to the pipe; and Figs. 9 and 10 show connection between the lever and connecting rod.

Similar letters refer to similar parts throughout the several views.

Two or more pipes O O connected together by a tee pipe coupling, R, constitute the body of the sprinkler, one end of which is closed, as shown in Fig. 1, where it will be seen that flexible hose M, are fastened to the tee couplings by clamps I, a nozzle being connected to the outer end of each of said hose; the nozzles are connected by a rod L, which passes through the guides D mounted on the pipes O. A lever P is pivoted to clamp B on pipe O and to the rod L at E. The pipe O is connected to a supply pipe Q by a ball joint K, which permits the pipe to rotate. The lever P serves both to rotate the pipe and to shift the position of the nozzles.

I claim—

1. The combination in a water sprinkler of a longitudinal pipe rotatively connected with a source of water supply, a series of nozzles each connected to said pipe by flexible hose, a rod connecting said nozzles, guides for said rod, and a lever for rotating said pipe and operating said rod to adjust the position of the nozzles substantially as set forth.

2. The combination in a water sprinkler of a rotary pipe, a series of nozzles flexibly connected thereto, a rod connecting said nozzles, a lever connected to said rod and pipe for rotating the pipe and shifting the position of the nozzles.

JAMES M. ALDEN.

Witnesses:
 C. A. WRIGHT,
 E. W. BROWN.